Patented Oct. 4, 1932

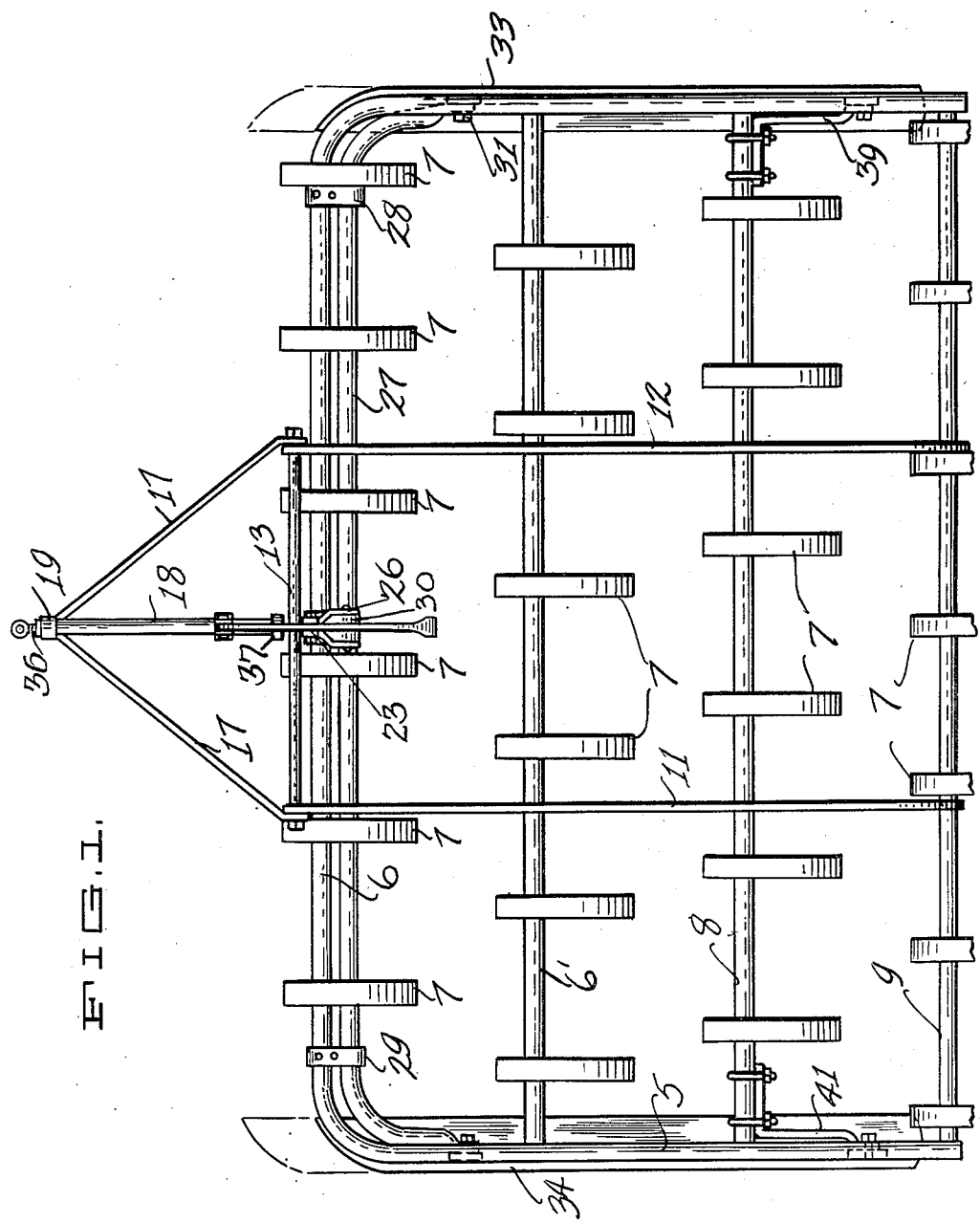

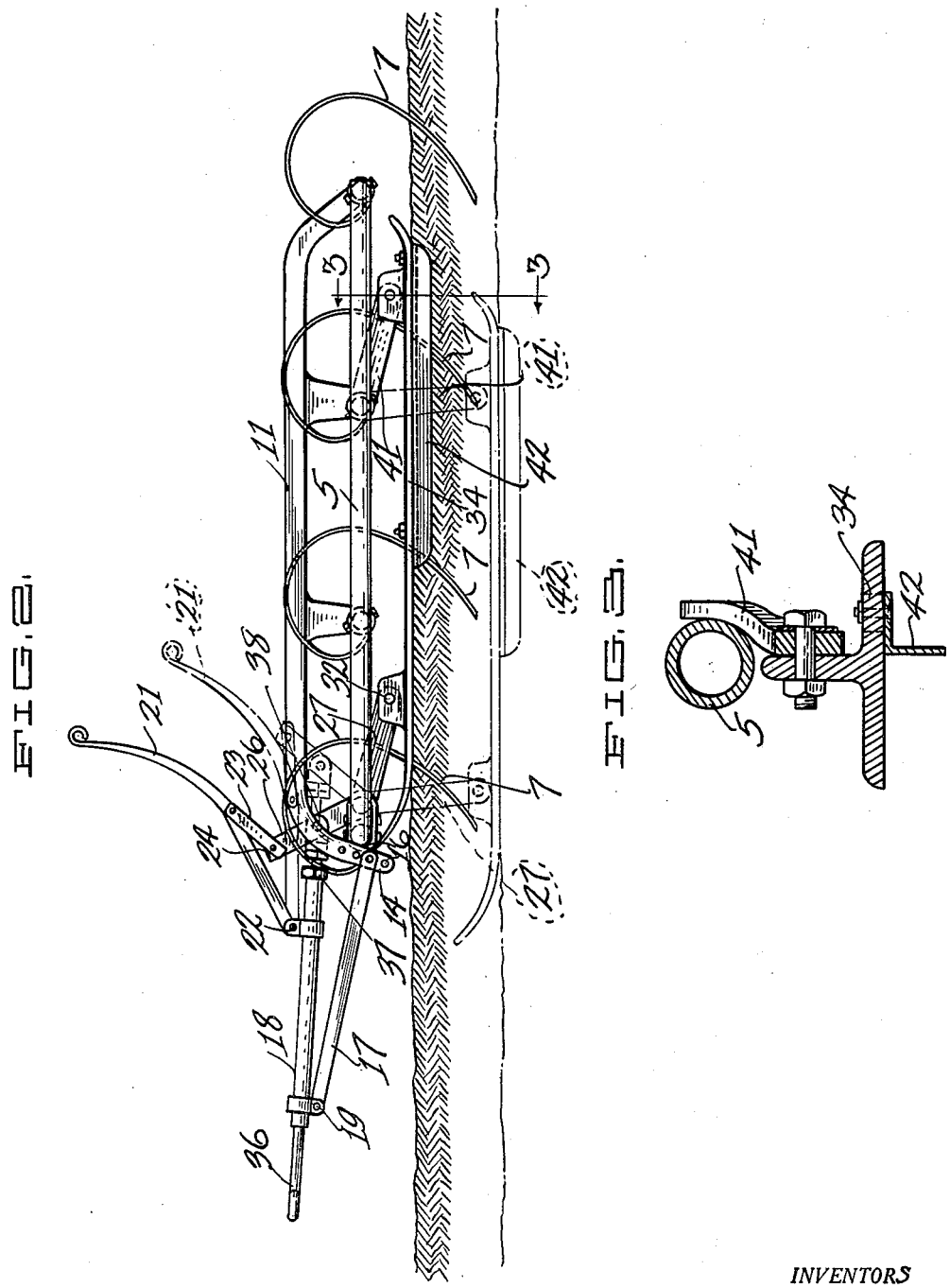

1,880,577

UNITED STATES PATENT OFFICE

ERNEST S. THOMPSON AND JAMES R. ULERY, OF STRATHMORE, CALIFORNIA

CULTIVATOR

Application filed December 4, 1931. Serial No. 579,010.

This invention relates to improvements in cultivators.

The principal object of the invention is to produce a harrow which will insure the penetration of all of the teeth of the harrow and thus assist in leveling the ground.

Another object is to provide means whereby spacing of the teeth will prevent choking and yet permit all the ground to be effectively cultivated.

Another object is to produce a device of this character wherein the strength of the device will cause the proper penetration and thus cultivation of the ground.

An additional object is to produce a device whereby the tipping and lifting may be accomplished from the tractor, while in motion.

A further object is to produce a device wherein the cultivator will be prevented from side slipping.

A further object is to produce a device which is economical to manufacture.

A still further object is to provide means whereby the depth to which the teeth may penetrate may be readily adjusted.

Other objects and advantages will be apparent during the course of the following description.

In the accompanying drawings forming a part of this specification and in which like numerals are employed to designate like parts throughout the same, Fig. 1 is a top plan view of our cultivator which, in the present instance, takes the form of a harrow, Fig. 2 is a side elevation of Fig. 1, and Fig. 3 is a vertical cross section taken on the line 3—3 of Fig. 2.

In the accompanying drawings wherein for the purpose of illustration is shown a preferred embodiment of our invention, the numeral 5 designates a frame preferably made of tubular pipe having cross pieces 6, 6', 8 and 9 rigidly secured so as to form a unit structure to which harrow teeth 7 are attached. A pair of draw bars 11 and 12 are attached to the cross pieces 6, 6', 8 and 9 and to a cross link 13.

By viewing Fig. 2 it will be noted that these draw bars have their forward ends bent downwardly as shown at 14 and are provided with openings 16 which permits the cross link 13 to be adjustably attached thereto. A yoke 17 has its ends connected to the ends of the cross link 13 and to a tubular element 18 as at the point 19. A trip lever 21 is pivoted as at 22 to the tubular member 18, and has connected thereto a link 23, which is in turn pivoted as at 24 to an arm 26, which is rigidly secured to a yoke 27 pivoted, as at 28, 29, and 30, to the cross piece 6. The lower end of this yoke is pivoted as at 31 and 32 to runners 33 and 34 respectively. A pull rod 36, which is adapted to be attached to a tractor, extends through the tubular member 18 and has mounted thereon adjusting nut 37 and has its rear end connected as at 38 to the lever 26. The rear end of the runners 33 and 34 are connected by links 39 and 41 to the cross piece 8. By viewing Fig. 3 it will be noted that a fin member 42 is attached to the underside of the runner 34. There is one of these fin or angle members attached to each of the runners.

In operation, when the lever 21 is in the full line position the draw upon the rod 36 will be transmitted through the nut 37 to the tubular member 18 and thence through the yoke 17 to the draw bars 11 and 12 and to the whole frame. This pull upon the device will hold the lever 26 in such a position that the runners 33 and 34 will be at a point above the bottom of the harrow teeth. As a result the harrow teeth will penetrate the ground and as the harrow moves over the ground, these teeth will effectively cultivate the same. By now backing the tractor, rearward movement will be given the rod 36, which movement will be transmitted to the lever 26 and yoke 27, with the result that the frame 5 will be elevated about the pivot points of the runner connections. As soon as the rearward movement has been sufficient to move the parts into the dotted line position, the harrow teeth will have been withdrawn from the ground and elevated above the same, in the drawing of Fig. 2 it being assumed that the dotted line position of the runners is now the ground level. At the same time the pivotal connection 24 and the pivotal connection 22 will be above the pivotal connection between the link 23 and lever 21. As a consequent a locking action will take place and after this time forward movement of the tractor will only result in dragging the entire device over the ground and will hold the frame against dropping.

When it is desired to drop the frame so as to cause the harrow teeth to enter the ground, the lever 21 is given a slight movement upwardly, sufficient to break the toggle joint, after which the parts will again assume the full line position of Fig. 2. By varying the connection between the yoke 17 and openings 16 the harrow may be caused to dig in the ground at either the front or back, and by adjusting the nut 37, the depth of the digging in of the entire device may be controlled. The fin members 42 attached to the runners 33 and 34 act to guide these runners over the ground, and due to the fact that they will enter the ground due to the weight of the machine, they prevent side slipping of the machine with relation to the tractor drawing the same. If desired these fins may be made adjustable with respect to the runners so that they may be angularly disposed with relation to the longitudinal axis of the runner or in other words may have one of the ends offset so as to counteract side movement, which might be caused by uneven land conditions or due to differing ground conditions, such as in an orchard where the ground is wet next to the trees and dry away from the trees.

It is to be understood that the form of our invention herewith shown and described is to be taken as a preferred example of the same and that various changes relative to the material, size, shape and arrangement of parts may be resorted to without departing from the spirit of the invention or the scope of the subjoined claims.

Having thus described our invention, we claim:—

1. In a device of the character described, a frame having cross members secured thereto, teeth secured to said cross members, a pair of runners positioned beneath said frame, links pivotally connecting the rear end of said runners to said frame, a yoke pivoted to said frame and to the forward portion of said runners, a lever secured to said yoke, a pull rod secured to said lever, a strip lever pivoted above said frame, a link connecting said lever and said trip lever, the pivotal points between said link and said trip lever forming a toggle connection when said frame is at its upper limit of movement above said runners.

2. In a device of the character described, a frame, cross bars secured to said frame, teeth secured to said cross bars, draw bars secured to cross bar and having their forward ends bent downwardly to a point beneath the plane of said frame, the ends of said draw bars having openings formed therein, a cross link extending between said draw bars and adjustably held in said openings, a yoke secured to the ends of said cross link, a tubular member secured to said yoke, a sliding rod extending through said tubular member, an adjusting nut positioned on said rod and adapted to engage the end of said tubular member, runners positioned beneath said frame, pivoted links extending between said frame and the rear end of said runners, a yoke pivoted to said frame and to the forward end of said runners, a lever secured to said link and to said sliding rod, and locking means interposed between said lever and said tubular member for holding said frame and said teeth in elevated position with respect to said runners.

In testimony whereof we affix our signatures.

ERNEST S. THOMPSON.
JAMES R. ULERY.